(12) United States Patent
Tsirkin et al.

(10) Patent No.: US 12,498,953 B2
(45) Date of Patent: Dec. 16, 2025

(54) MEMORY MANAGEMENT FOR BUSY VIRTUAL MACHINE GUESTS

(71) Applicant: Red Hat, Inc., Raleigh, NC (US)

(72) Inventors: Michael Tsirkin, Yokneam Illit (IL); Andrea Arcangeli, Mineola, NY (US)

(73) Assignee: Red Hat, Inc., Raleigh, NC (US)

( * ) Notice: Subject to any disclaimer, the term of this patent is extended or adjusted under 35 U.S.C. 154(b) by 746 days.

(21) Appl. No.: 17/851,593

(22) Filed: Jun. 28, 2022

(65) Prior Publication Data
US 2023/0418643 A1 Dec. 28, 2023

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC ........ G06F 9/45558; G06F 2009/4557; G06F 2009/45583
See application file for complete search history.

(56) References Cited

U.S. PATENT DOCUMENTS

| | | | |
|---|---|---|---|
| 8,607,013 B2 | 12/2013 | Chen et al. | |
| 9,201,612 B1* | 12/2015 | Vincent | G06F 9/4856 |
| 9,286,101 B2 | 3/2016 | Riel | |
| 9,552,233 B1 | 1/2017 | Tsirkin et al. | |
| 10,073,711 B2* | 9/2018 | Zheng | G06F 9/5027 |
| 10,768,959 B2 | 9/2020 | Tsirkin et al. | |
| 2002/0002650 A1* | 1/2002 | Christenson | G06F 12/0607 |
| | | | 711/E12.079 |
| 2006/0222019 A1* | 10/2006 | Hedin | H04J 3/0685 |
| | | | 370/509 |
| 2008/0155167 A1* | 6/2008 | Mansell | G06F 13/24 |
| | | | 711/6 |
| 2008/0235793 A1* | 9/2008 | Schunter | G06F 21/64 |
| | | | 718/1 |
| 2012/0011508 A1* | 1/2012 | Ahmad | G06F 9/45558 |
| | | | 718/1 |

(Continued)

OTHER PUBLICATIONS

Miller, Konard et al., "XLH: More Effective Memory Deduplication Scanners through Cross-Layer Hints", Karlsruhe Institute of Technology (KIT), 2013, https://www.usenix.org/system/files/conference/atc13/atc13-miller.pdf, 12 pages.

(Continued)

*Primary Examiner* — Tuan C Dao
(74) *Attorney, Agent, or Firm* — Womble Bond Dickinson (US) LLP

(57) ABSTRACT

Systems and methods for enhancing memory management for virtual machines. An example method may comprise: accessing, by a hypervisor running on a host computer system, a data structure exposed by a virtual machine managed by the hypervisor, wherein the data structure includes an estimated next access time for one or more memory pages of a plurality of memory pages associated with the virtual machine; estimating a read latency time associated with the virtual machine; identifying, using the data structure, a memory page associated with an estimated next access time that satisfies a predefined condition with respect to the read latency time; and swapping out the memory page.

20 Claims, 8 Drawing Sheets

(56) References Cited

U.S. PATENT DOCUMENTS

| | | | | |
|---|---|---|---|---|
| 2012/0030406 | A1* | 2/2012 | Chang | G06F 12/126 |
| | | | | 711/6 |
| 2013/0185474 | A1* | 7/2013 | Ge | G06F 9/45558 |
| | | | | 711/6 |
| 2013/0275973 | A1* | 10/2013 | Greenfield | G06F 21/10 |
| | | | | 718/1 |
| 2014/0143507 | A1* | 5/2014 | Maria Joseph | G06F 3/0644 |
| | | | | 711/E12.098 |
| 2014/0244938 | A1* | 8/2014 | Cota-Robles | G06F 9/30 |
| | | | | 711/137 |
| 2015/0039838 | A1* | 2/2015 | Tarasuk-Levin | G06F 9/5016 |
| | | | | 711/137 |
| 2015/0095919 | A1* | 4/2015 | Vincent | G06F 12/109 |
| | | | | 718/104 |
| 2016/0048401 | A1* | 2/2016 | Bhat | G06F 3/0673 |
| | | | | 718/1 |
| 2017/0034297 | A1* | 2/2017 | Waheed | H04L 43/0817 |
| 2017/0315931 | A1* | 11/2017 | Liu | G06F 12/0253 |
| 2018/0341555 | A1* | 11/2018 | Tsao | G06F 11/1466 |
| 2020/0125443 | A1* | 4/2020 | Hung | G11C 16/08 |
| 2020/0341797 | A1* | 10/2020 | Tsirkin | G06F 3/0647 |
| 2021/0182191 | A1 | 6/2021 | Hildenbrand et al. | |
| 2021/0342260 | A1 | 11/2021 | Tsirkin | |
| 2022/0050722 | A1* | 2/2022 | Dugast | G06F 9/5016 |
| 2022/0066678 | A1* | 3/2022 | Singidi | G06F 3/064 |

OTHER PUBLICATIONS

Whitaker, Andrew et al., "Denali: Lightweight Virtual Machines for Distributed and Networked Applications", The University of Washington, http://web.cs.ucla.edu/~miodrag/cs259-security/whitaker02denali.pdf, 14 pages.

\* cited by examiner

MEMORY MANAGEMENT FOR BUSY VIRTUAL MACHINE GUESTS

TECHNICAL FIELD

The present disclosure is generally related to virtualization in a computing environment, and more particularly, to virtualization technology that enhances memory management for busy virtual machines.

BACKGROUND

Virtualization allows multiplexing of an underlying host machine between different virtual machines. The virtualization is commonly provided by a hypervisor (e.g., virtual machine monitor (VMM)) and enables the hypervisor to allocate a certain amount of a host system's computing resources to each of the virtual machines. Each virtual machine is then able to configure and use virtualized computing resources (e.g., virtual processors) to execute executable code of a guest operating systems. A host machine can accommodate more virtual machines than the size of its physical memory allows, and give each virtual machine the impression that it has a contiguous address space, while in fact the memory used by the virtual machine may be physically fragmented and even overflow to disk storage.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
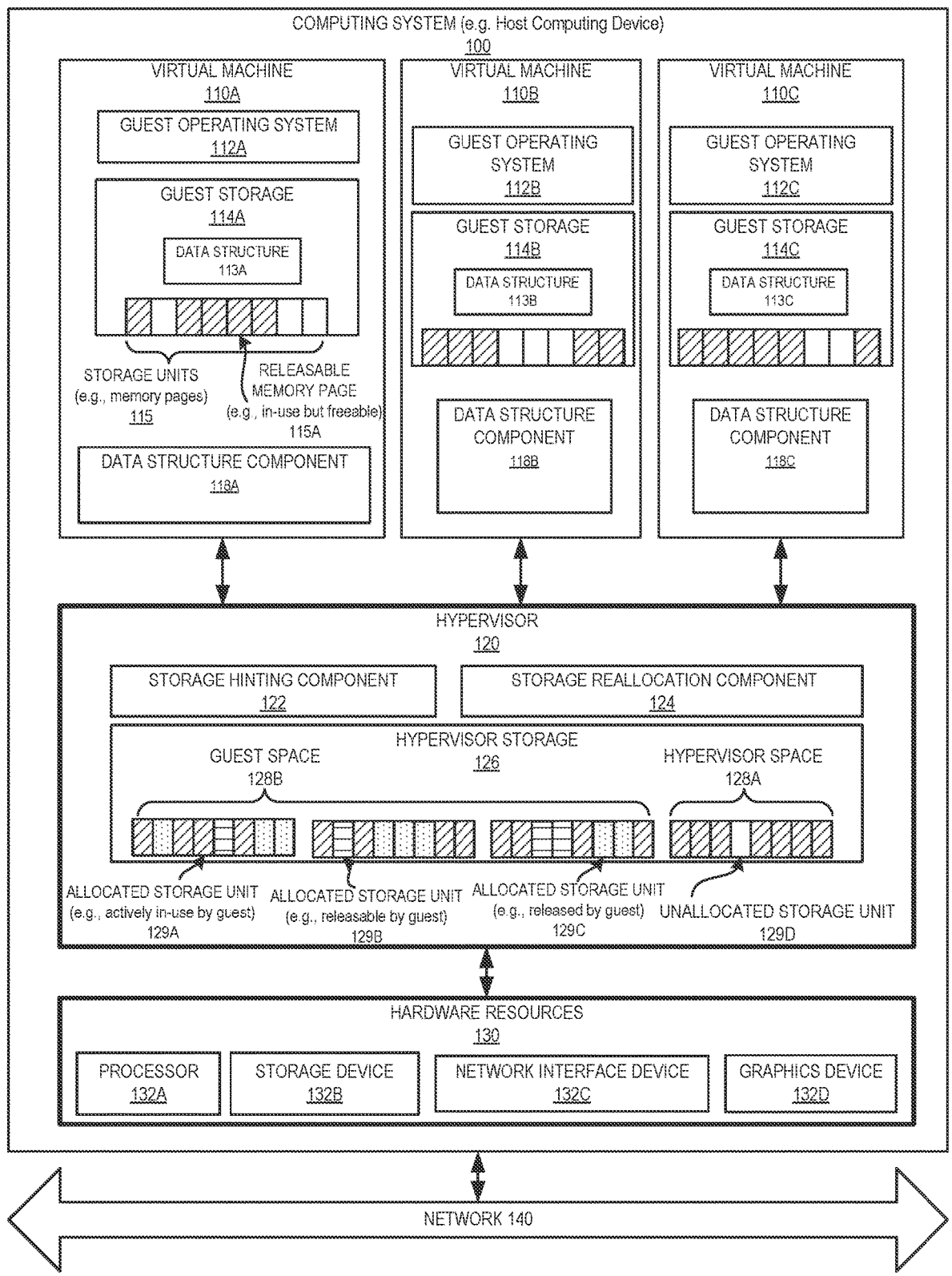
FIG. 1 depicts a high-level block diagram of an example computing system that enables enhancing memory management for virtual machines, in accordance with one or more aspects of the present disclosure.

Various computer systems that support hardware virtualization manage memory by using paging out and in. When the host machine needs to free up memory, it selects memory pages that have been assigned to virtual machines, and pages out the contents of those memory pages to disk storage. When the virtual machines attempt to access those memory pages, the host machine pages in the content of the memory page by reading the content stored in disk storage and writing the content back to memory. Swapping out and swapping in memory pages requires input/output (I/O) operations, which can cause significant delay for the virtual machine.

A virtualized computer system can include overlapping storage management features that manage the underlying physical storage resources. A hypervisor may allocate storage to a virtual machine but may be unaware of which portions of storage are in use by a guest operating system executing on the virtual machine. Knowledge of the guest operating system's use of the storage may be beneficial to a hypervisor managing memory because portions of storage that have been released by the guest operating system may be reused by the hypervisor without the overhead of copying the data to and from persistent storage (e.g., page swapping). In some implementations, a guest operating system may share memory use information with the hypervisor by transmitting messages that identify particular guest memory pages that are not being used by the guest operating system (i.e., perform free page hinting). The hypervisor may utilize the memory use information when determining a portion of memory to evict. However, in some instances, the guest operating system may have few pages that are not being used but a good amount of pages that are being used to cache data, and free page hinting would become ineffective.

Aspects of the present disclosure address the above and other deficiencies by providing technology that enables enhanced memory management for busy virtual machines that do not have much free memory. An example method may involve exposing a guest data structure to a hypervisor that manages a busy virtual machine to allow the hypervisor to get visibility regarding the memory that is not currently free but may become available (e.g. cache), and select a portion thereof to swap. The busy virtual machine may maintain a guest data structure that includes information regarding the memory pages of the busy virtual machine. For example, the data structure may include lists of multiple memory pages that are sorted by the likelihood of a specific memory page getting accessed in future, and such likelihood may be represented by an expected time until next access to a specific memory page. The hypervisor may read the guest data structure, for example, periodically or upon receiving a request for additional memory, to scan for a memory page that satisfies a predetermined condition such that the memory page, although in use, can be swapped out without sacrificing the performance of the computing system. For example, the hypervisor may estimate an expected time for reading a specific memory page from a backing store associated with the busy virtual machine, which may include VM exit processing time, and compare the expected read time with the expected next access time in the guest data structure to find a memory page that satisfies a predetermined condition based on the comparison. In one example, the predetermined condition based on the comparison may involve having the expected next access time exceed the expected read time adjusted by a value (e.g., multiplied by a factor of 10). As such, the busy virtual machine may locate one or more memory pages that are in use but can be swapped out without adversely affecting the performance of the busy virtual machine. Thereafter, the hypervisor may block the busy virtual machine's access to the located memory page(s), swap content of the memory page(s) out to a backing store, and reuse the memory page(s) for other task(s). The identification of the memory page(s) enables the enhanced memory management for busy virtual machines. This further enables hypervisor to reallocate storage units in a more efficient manner, especially when free page hinting does not apply.

The systems and methods described herein include technical improvements to virtualization technology. In particular, aspects of the present disclosure may enhance the ability of the hypervisor and the virtual machine to manage memory of the busy virtual machines. In one aspect, the present disclosure may enable the hypervisor and the virtual machine to more efficiently deal with additional storage request when there are no many free memory pages and to take actions to enhance the operation of the virtualized environment. In another aspect, the present disclosure may enable the actions to be performed by the hypervisor and the virtual machine in a more resource-efficient manner. In one example, memory management may be performed by the hypervisor using a guest data structure providing information of usage prediction and identifying a page for swap when a predetermined condition is satisfied. In yet another aspect, the present discourse may help to avoid the situation that the host swap for used pages are typically disable because the host has no information regarding which page(s) can or is best to be swapped out. Enhancing the ability and efficiency of the hypervisor and the virtual machine for memory management may improve the virtualization technology. The enhancement may enable a computing system to reduce the amount of computing resources consumed by a set of virtual machines or enable the computing system to support an increased number of virtual machines using the same amount of computing resources.

Aspects of the present disclosure may also enhance the support of user space drivers and nested virtualization which further optimize the performance, security, and efficiency of a host computer system. A user space driver may be a device driver that is executed by a virtual machine as a user space process without kernel privileges. User space processes often have limited access to communicate with the hypervisor via hypercalls and the enhanced memory management including exposing the data structure discussed herein may enable more optimized communication with the hypervisor. Nested virtualization may also benefit by the technology disclosed herein and typically involves a host machine that provides multiple layers of virtualization. The multiple layers may include one or more hardware virtualization layers (e.g., virtual machines), operating system virtualization layers (e.g., containers), other virtualization layers, or a combination thereof. For example, a top level virtual machine may be executed within a lower level virtual machine and the lower level virtual machine may be managed by a hypervisor. The enhanced memory management exposing the data structure discussed herein may enable the top level virtual machine to directly signal (e.g., expose to) the hypervisor without signaling the lower level virtual machine (e.g., skip the intermediate virtual machine).

Various aspects of the above referenced methods and systems are described in details herein below by way of examples, rather than by way of limitation. The examples provided below discuss the technology above applied to a host machine that implements hardware virtualization. In other examples, the technology discussed herein may be applied generally to enable a user space driver to use a communication channel to interact with a kernel of a machine and the machine may or may not provide hardware level virtualization. Therefore, the systems and methods described herein represent improvements to the functionality of general purpose or specialized computing devices operating a virtualized environment with one or more virtual processors.

FIG. 1 depicts an illustrative architecture of elements of a computing system 100, in accordance with an embodiment of the present disclosure. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include one or more virtual machines 110A-C, a hypervisor 120, hardware resources 130, and a network 140.

Virtual machines 110A-C may execute guest executable code that uses an underlying emulation of physical resources. Virtual machines 110A-C may support hardware emulation, full virtualization, para-virtualization, operating system-level virtualization, or a combination thereof. The guest executable code may include guest operating systems 112A-C, a guest application, guest device drivers, etc. Virtual machines 110A-C may execute one or more different types of guest operating system, such as Microsoft®, Windows®, Linux®, Solaris®, etc. Virtual machines 110A-C may execute guest operating systems 112A-C that manage guest memory 114A-C respectively. It is noted that although virtual machines are described here, the present disclosure may also be applicable to other virtualized execution environments such as containers.

Guest operating systems 112A-C may manage aspects of guest memory caching, such as the allocation and the release of portions of guest storage 114A-C. Guest operating systems 112A-C may provide indications to hypervisor 120 of the memory pages that are released, allocated, or a combination thereof. In one example, guest operating systems 112A-C may allow the access to portions of guest storage 114A-C (e.g., data structure 113A-C) by the hypervisor 120 for identifying the memory pages that are releasable. Guest operating systems 112A-C may release a memory page in respond to a releasable memory page identified by the hypervisor.

Guest storage 114A-C may be data storage that is allocated by hypervisor 120 for use by virtual machines 110A-C respectively. Guest storage 114A-C may be any virtual memory, logical memory, physical memory, other portion of memory, or a combination thereof for storing, organizing, or accessing data. Guest storage 114A-C may represent the portion of memory that is designated by hypervisor 120 for use by one or more respective virtual machines 110A-C. Guest storage 114A-C may be managed by guest operating system 112A-C and may be segmented into storage units 115 (e.g., guest memory pages). Storage units 115 may be logical or physical units of data storage for storing, organizing, or accessing data. Storage units 115 may each include a contiguous or non-contiguous sequence of bytes or bits and may have a page size that is the same or different from a memory page size used by hypervisor 120. In one example, a storage unit may be a virtual representation of underlying physical storage units, which may be referred to as physical storage units. Storage units 115 may have a unit size that is the same or different from a physical block size provided by an underlying hardware resource. The block size may be a fixed-size, such as a particular integer value (e.g., 4 KB, 4 MB, 1 GB) or may be a variable-size that varies within any range of integer values.

Storage units 115 may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, storage units 115 may be a memory segment and each memory segment may correspond to an individual memory page, multiple memory pages, or a portion of a memory page. Storage units 115 may include releasable memory page 115A that is in use by the guest operating system 112A but is free-able (e.g., used as cache).

As shown in FIG. 1, virtual machines 110A-C may include data structure component 118A-C to generate and update data structure 113A-C, respectively. Data structure component 118A-C may determine settings for establishing the data structure, which may relate to the memory locations being accessed, the processes and instructions being executed, the computing tasks being performed, other settings, or a combination thereof. The components discussed herein are purely logical, and one or more components can be implemented by one or more hardware and/or one or more software modules. Data structure component 118A-C may write data into the data structure 113A-C that will be used to provide information regarding a plurality of memory pages associated with the virtual machines 110A-C.

Data structure 113A-C may be generated and modified by the respective virtual machines 110A-C and may be accessible to the hypervisor 120. Data structure 113A-C may be an array (e.g., bitmap), a linked list, other data structure, or a combination thereof. Data structure 113A-C may include an estimate next access time for respective memory page, i.e., an expected time until next access to a memory page. The estimate next access time may be estimated and/or provided by the guest operating system in various ways. In one example, data structure 113A-C may include lists of multiple memory pages and they are sorted by the likelihood that a memory page will get accessed in a near future. In another example, data structure 113A-C may include multi-generational least-recently-used data structure. The multi-generational least-recently-used data structure may include multiple generations, for example, including "active," "likely to be active," "likely to be inactive," and "inactive," that represent an order that a memory page would be reclaimed when memory is requested. In yet another example, data structure 113A-C may include multi-tier least-recently-used data structure. The multi-tier least-recently-used data structure may include multiple tiers sorted by the frequency of access.

Data structure 113A-C may be a shared data structure that can be updated by the virtual machine or the hypervisor. The shared data structure may be portion of a shared memory, which may be any physical, logical, or virtual memory at any level of the memory hierarchy (e.g., L1-L3 Cache, main memory, auxiliary memory, memory swap space, etc.). In one example, the shared data structure may be stored in memory page space of the virtual machine. In the example illustrated in FIG. 1, each virtual machine may include a shared data structure in its respective guest storage 114A-C, which may be accessible to hypervisor 120. In another example, the shared data structure may be stored in hypervisor storage 126 and be accessible to one or more of the virtual machines. In the latter example, there may be a separate shared data structure within hypervisor storage 126 that corresponds to each of the virtual machine 110A-C or there may be a single shared data structure accessible to the group of virtual machines 110A-C.

Hypervisor 120 may also be known as a virtual machine monitor (VMM) and may provide one or more virtual machines 110A-C with direct or emulated access to hardware resources 130. In the example shown, hypervisor 120 may run directly on the hardware of computing system 100 (e.g., bare metal hypervisor). In other examples, hypervisor 120 may run on or within a host operating system (not shown). Hypervisor 120 may manage system resources, including access to hardware resources 130. Hypervisor 120, though typically implemented as executable code, may emulate and export a bare machine interface to higher-level executable code in the form of virtual processor and data storage (e.g., guest memory). Higher-level executable code may comprise a standard or real-time operating system (OS), may be a highly stripped down operating environment with limited operating system functionality and may not include traditional OS facilities, etc. Hypervisor 120 may support any number of virtual machines (e.g., a single VM, one hundred VMs, etc.).

Hypervisor 120 may include hypervisor storage 126, which may include multiple storage units that are separated into a hypervisor space 128A and a guest space 128B. Other portions of hypervisor memory may be allocated for use by hypervisor 120, a host operating system, hardware device, other module, or a combination thereof. Hypervisor space 128A may be allocated for use by hypervisor 120 and guest space 128B may be allocated to virtual machines 110A-C and may correspond to guest storages 114A-C. Each of the storage blocks within hypervisor storage 126 may be either allocated (e.g., 129A and 129B) or unallocated (e.g., 129C). An allocated storage unit may be allocated by hypervisor 120 for use by one of the guest operating systems 112A-C, may be allocated and actively in-use by the guest, allocated and not actively in use (e.g., releasable), or allocated and not in use (e.g., released). The unallocated storage unit may be memory pages that have not yet been allocated by hypervisor storage 126 or were previously allocated by hypervisor 120 and have since been deallocated (e.g., freed) by hypervisor 120.

Hypervisor storage 126 may include hypervisor memory pages 129A-D, which may be in different states. The states may correspond to whether or not the hypervisor memory page has been allocated to a virtual machine and whether the hypervisor memory page is in use or is not in use by the virtual machine it is allocated to. Hypervisor memory page 129D may represent a memory page that is unallocated and hypervisor memory pages 129A-C may represent memory pages that have been allocated. Each of hypervisor memory pages 129A-C may be allocated by hypervisor 120 to a virtual machine but may include a different proportion of the memory page that is in use or not in use by the virtual machine it is allocated to. For example, hypervisor memory page 129C may be completely unused by the guest virtual machine that it is allocated to. Hypervisor memory page 129A may be active in use, and may be partially active in use and partially not in use by a guest virtual machine or may be fully active in use by the virtual machine it is allocated to.

As shown in FIG. 1, hypervisor memory page 129B may be in use but free-able (e.g., releasable) by guest operating system 112A and may correspond to releasable guest memory page 115A.

Releasable guest memory page 115A may be any portion of guest storage 114A that is releasable by the guest operating system 112A. Releasable guest memory page 115A may be identified by the hypervisor 120 (e.g., through storage hinting component 122) and an operation of reallocating the releasable guest memory page 115A may be performed by the hypervisor 120 (e.g., through storage reallocation component 124). As shown in FIG. 1, hypervisor 120 may include a storage hinting component 122 and a storage reallocation component 124. The components discussed herein are purely logical, and one or more components can be implemented by one or more hardware and/or one or more software modules.

Components 122 and 124 may enable hypervisor 120 to communicate with virtual machines 110A-C regarding estimated next access time for each memory page for a plurality of memory pages in each of virtual machines 110A-C and identify a releasable memory page (e.g., releasable memory page 115A) for storage reallocation. Each of the components may be separated into one or more components or may be included within the same component. Storage hinting component 122 may enable hypervisor 120 to interact with virtual machines to identify a memory page associated with an estimated next access time that satisfies a predefined condition with respect to the read latency time, using the data structure received from virtual machines in the form of one or more indications. Storage reallocation component 124 may interact with storage hinting component 122 to swap out portions of the memory that is identified as releasable and can be allocated (e.g., reallocated) to fulfill requests from computing entities for additional storage units. Storage hinting component 122 and storage reallocation component 124 may communicate with guest operating systems 112A-C regarding releasable memory pages, and vice versa.

Hardware resources 130 may provide hardware features for performing computing tasks. In one example, one or more of the hardware resources may correspond to a physical device of computing system 100. In another example, one or more of the hardware resources may be provided by hardware emulation and the corresponding physical device may be absent from computing system 100. For example, computing system 100 may be a server machine that does not include a graphics device (e.g., graphics card) or includes a graphics device that does not support a particular hardware feature. Hypervisor 120 may provide the hardware feature of the hardware resource by emulating a portion of the hardware resource (e.g., provide a virtualized graphics device). The emulation of a portion of a hardware resource may be provided by hypervisor 120, virtual machine 110, host operating system (not shown), another hardware resource, or a combination thereof.

In the example shown in FIG. 1, hardware resources 130 may include a processor 132A, a storage device 132B, a network interface device 132C, a graphics device 132D, other physical or emulated devices, or combination thereof. Processor 132A may refer to devices capable of executing instructions encoding arithmetic, logical, or I/O operations. Processor 132A may be a single core processor, which may be capable of executing one instruction at a time (e.g., single pipeline of instructions) or a multi-core processor, which may simultaneously execute multiple instructions. Storage device 132B may include any data storage that is capable of storing digital data, such as physical memory devices including volatile memory devices (e.g., RAM), non-volatile memory devices (e.g., NVRAM), other types of memory devices, or a combination thereof. Storage device 132B may include mass storage devices, such as solid-state storage (e.g., Solid State Drives (SSD)), hard drives, other persistent data storage, or a combination thereof. Network interface device 132C may provide access to a network internal to the computing system 100 or external to the computing system 100 (e.g., network 140) and in one example may be a network interface controller (NIC). Graphics device 132D may provide graphics processing for the computing system 100 and/or one or more of the virtual machines 110. One or more of the hardware resources 130 may be combined or consolidated into one or more physical devices or may partially or completely emulated by hypervisor 120 as a virtual device.

Network 140 may be a public network (e.g., the internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
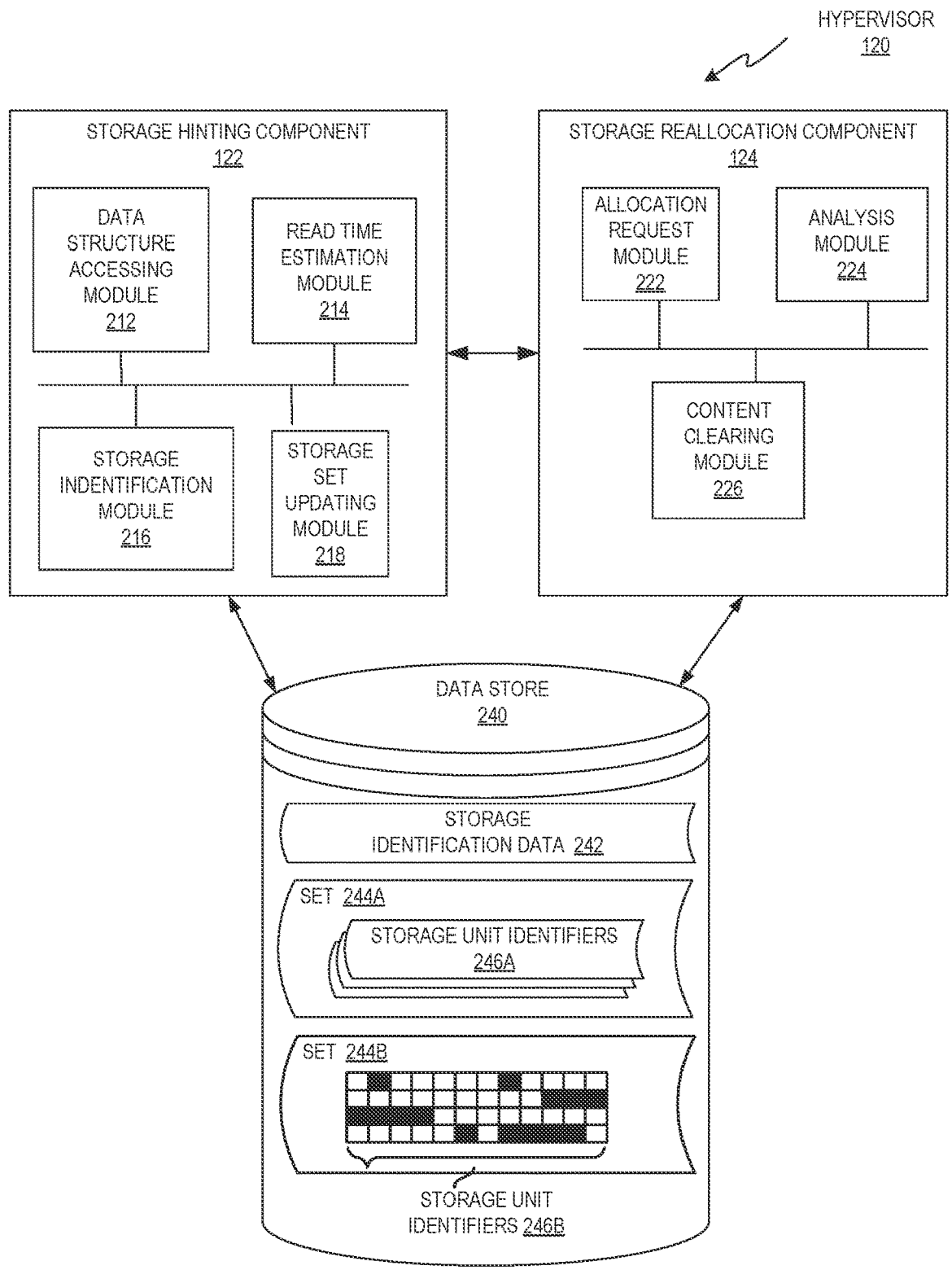
FIG. 2 depicts a block diagram illustrating components and modules of an example hypervisor, in accordance with one or more aspects of the present disclosure.

FIG. 2 depicts a block diagram illustrating an exemplary hypervisor 120 that performs the enhanced memory management for virtual machines to use memory that is not currently free but may become available, in accordance with one or more aspects of the present disclosure. Hypervisor 120 may be the same or similar to hypervisor of FIG. 1 and may include a storage hinting component 122, a storage reallocation component 124, and a data store 240. The components and modules discussed herein may be performed by any portion of hypervisor 120 or a host operating system, by any portion of virtual machine or a guest operating system, by other portion of a computing system, or a combination thereof. More or less components or modules may be included without loss of generality. For example, two or more of the components may be combined into a single component, or features of a component may be divided into two or more components. In one implementation, one or more of the components may reside on different computing devices (e.g., a client device and a server device).

Storage hinting component 122 may enable the hypervisor 120 to identify a memory page associated with an estimated next access time that satisfies a predefined condition with respect to the read latency time, using the data structure received from virtual machines in the form of one or more indications. Storage hinting component 122 may process to identify a set of storage units that have been assigned to and in use by a virtual machine but being used in a free-able way, such as caches. In the example shown in FIG. 2, storage hinting component 122 may include a data structure accessing module 212, a read time estimation module 214, a storage identification module 216, and a storage set updating module 218.

Data structure accessing module 212 may enable hypervisor 120 to access portion or all of data structure in the virtual machine. The data structure may include an element (e.g., a record) for each of the storage units and the element may indicate an estimated next access time for each of the storage units, i.e., an expected time until the next access to a specific memory page. The next access time for each of the storage units may be estimated by the virtual machine by analyzing a lapsed time from last access to a memory page and/or a frequency of access to a memory page. In one example, the data structure may be stored in storage space of the virtual machine that is accessible by the hypervisor. In another example, the data structure may be stored in storage space of the hypervisor that is accessible by the virtual machine. In either example, data structure accessing module 212 may access the data structure to obtain the next access time for each of the storage units of the virtual machine.

Read time estimation module 214 may enable hypervisor 120 to estimate a read latency time with respect to the virtual machine, i.e., an expected time for the virtual machine to read a memory page from a backing store. In one example, the read latency time may additionally include a VM exit time, which represents the transition time for the virtual machine temporarily yielding execution control to the hypervisor. The read latency time may be predetermined during manufacturing the storage device and/or may be updated according to various optimization methods.

Storage identification module 216 may enable hypervisor 120 to identify a releasable memory page, i.e., a memory page associated with an estimated next access time that satisfies a predefined condition with respect to the read latency time. The identified memory page would represent a memory page that is currently in use but may become available. This is beneficial in the situations where the virtual machine does not have many memory pages that are not in use, and some of the in-use but free-able memory pages can be reallocated for other uses. In one example, hypervisor 120 may identify the releasable memory page by determining whether the next-access time is larger than or equal to the read-latency time adjusted (e.g. multiplied or added) by a factor value for each said memory page and identifying the memory page as releasable if it is determined that the next-access time is larger than or equal to the read-latency time adjusted (e.g. multiplied or added) by a factor value. The factor value may be set to be dependent on a memory stress metric. For example, the memory stress metric may include a count for each time that additional memory request is received during a time period, and the larger the memory stress metric the lower the factor value. For another example, the factor value may be at least 10. In another example, hypervisor 120 may identify the releasable memory page by calculating a value based on the comparison of the next-access time and the read-latency time for each memory page and identifying the memory page as releasable if the value is no less than a threshold value. The threshold value may be set to be dependent on the memory stress metric similarly as described above.

Storage identification module 216 may also enable hypervisor 120 to identify a releasable memory page among memory pages of a plurality of virtual machines. In one example, storage identification module 216 may identify, for each virtual machine, a releasable memory page among memory pages as described above, and then compare the releasable memory pages from all virtual machines to identify one of them as the releasable memory page or identify them by ranking from most ideal to least ideal as releasable. In another example, storage identification module 216 may analyze and compare the data structures of all virtual machines and identify one virtual machine as a candidate, and then identify a releasable memory page of the candidate virtual machine as described above.

Storage identification module 216 may store the data of storage identification module 216 as storage identification data 242 in data store 240. Data store 240 may be any storage portion that is modifiable by hypervisor 120 and may include a storage unit of hypervisor storage. Storage identification data 242 may identify one or more storage units or ranges of storage units. Storage identification data 232 may include an offset value (numeric or non-numeric value), an address (virtual, logical, or physical address), a pointer, a link, other data, or a combination thereof. In one example, the identification data may be a storage unit identifier that uniquely identifies a released storage unit or may be data (e.g., offset value) that may be used by hypervisor 120 to determine the storage unit identifier of a released storage unit. In another example, the identification data may include a reference to a data structure that indicates the one or more storage units that are released (e.g., not in use), non-released (e.g., in use), or a combination thereof. The data structure may be an array (e.g., bitmap), a linked list, other data structure, or a combination thereof.

Storage set updating module 218 may update a set of storage units based on data of storage identification module 216. The set may be update to reflect the storage units that are allocated to and in use by a virtual machine but content stored is repetitive or only helpful in speeding up a process. Updating the set may involve adding storage units to the set or removing storage units from the set depending on whether the storage units are available to be reallocated by the hypervisor. In one example, storage set updating module 218 may add a storage unit to the set of storage units in response to receiving an indication that the storage unit is releasable and determining the releasable storage unit is exclusively accessed by a single computing entity. In another example, storage set updating module 218 may add a releasable storage unit to the set of storage units in response determining that the storage unit is shared by multiple computing entities and was releasable by each of the respective computing entities. The set of storage units may be represented by a data structure such as set 244A or set 244B.

Sets 244A and 244B may both include one or more storage unit identifiers and computing entity identification data. The storage unit identifiers may include storage unit identification data that is used to identify one or more storage units or ranges of storage units. The computing entity identification data may be used to identify the computing entity that is associated with or was previously associated with the storage unit (e.g., previous owner or assignee). The computing entity identification data may be useful because it may indicate the source of the content within the storage unit and may be subsequently used to determine whether the content of a reallocated storage unit should be cleared. Computing entity identification data may identify a particular virtual machine, guest operating system, process, thread, other computing stream, or a combination thereof. In one example, the computing entity identification data may be a unique identifier (e.g., virtual machine identifier). In another example, the computing entity identification data may be a pointer (e.g., memory address) to the virtual machine or a memory structure that describes the virtual machine. Although sets 244A and 244B both include storage unit and computing entity identification data, they may store and represent the data differently.

Set 244A is an example set that includes one or more storage unit identifiers 246A and each of the storage unit identifiers 246A may include an offset value (numeric or non-numeric value), an address (virtual, logical, or physical address), a pointer, a link, other data, or a combination thereof. Storage unit identifier 246A may uniquely identify a storage unit that is in a released state (e.g., allocated and not in use), a releasable state (e.g., allocated, in use, and free-able), an active state (e.g., allocated, in use, and not free-able), unassigned (e.g., unallocated), other state, or a combination thereof. In one example, set 244A may only include the storage units that is releasable and ignore other storage units. In another example, set 234A may include storage units that have been released, being releasable, being active, or that are unallocated and they may be marked accordingly.

Set 244B is another example set that includes one or more storage unit identifiers 246B that represent corresponding storage units. Each of the storage unit identifiers 246B may be a flag (e.g., bit) that represents one or more states of a corresponding storage unit. The states may include a released state (e.g., allocated and not in use), a releasable state (e.g., allocated, in use, and freeable), an active state (e.g., allocated, in use, and not freeable), unassigned (e.g., unallocated, deallocated), assigned (e.g., allocated), other state, or a combination thereof. In one example, set 244B may be a bitmap and each storage unit identifier 246B may correspond to a binary flag (e.g., bit) that indicates whether the corresponding storage unit is available for reuse (e.g., released or releasable and exclusively assigned) or unavailable for reuse (e.g., active or not exclusively assigned). In other example, set 244B may be an n-dimensional array, linked list, other data structure, or a combination thereof.

Storage reallocation component 124 may interact with storage hinting component 122 to swap out portions of the storage that can be allocated (e.g., reallocated) to fulfill requests from computing entities for additional storage units. In the example shown in FIG. 2, storage reallocation component 124 may include an allocation request module 222, an analysis module 224, and a content clearing module 226.

Allocation request module 222 may receive or access a request from a virtual machine to allocate storage to the virtual machine. The virtual machine may initiate the request using a variety of different mechanism. A first mechanism may involve a failed attempt to access a storage unit that no longer resides at the designated location in the physical storage device. This may occur when the storage unit is a memory page and the memory page has been evicted. The attempt to access the memory page may generate a page fault, which may be addressed by an underlying memory management module. The page fault may function as the request to allocate storage. A second mechanism may involve a virtual machine initiating the request using a hypercall. The virtual machine may be executing in a para-virtualized environment and be aware of and able to communicate with the hypervisor using hypercalls. A hypercall may be similar to a system call but may enable a thread executed by the virtual machine to communicate with the hypervisor as opposed to the guest operating system.

Analysis module 224 may enable hypervisor 120 to analyze the set of storage units (e.g., set 234A or 234B) to identify and select one or more storage units that can be reallocated to satisfy the request for additional storage. Analysis module 224 may gather data about multiple different aspects of each storage unit, such as, the source of the storage unit (e.g., associated virtual machine, original owner), the size of the storage unit (e.g., standard page or huge page), the location of the storage unit (e.g., proximity to other released storage units), other information, or a combination thereof. The selection of a storage unit may take into account the amount of storage units that should be cleared, the locality of the storage units (e.g., whether they are partially or completely contiguous), the size alignment (e.g., a single huge page better then multiple standard pages), other aspects, or a combination thereof. Minimizing the amount of storage that should be cleared may involve determining which virtual machine requested a storage unit and comparing the requesting virtual machine to virtual machines associated with the releasable storage units. In one example, analysis module 224 may prioritize the releasable storage units that match the requesting virtual machine over releasable storage units that do not match the requesting virtual machine. In another example, analysis module 224 may weigh multiple different aspects (including clearing) and select the storage unit with the best (e.g., highest or lowest) weight.

In one example, analysis module 224 may enable hypervisor 120 to decide whether to release or relinquish the releasable memory page identified by hypervisor 120. The act of relinquishing storage may be different then the act of releasing storage, which is discussed above. Releasing storage may involve a guest operating system freeing the storage so that it is unused by the guest operating system even though the storage remains allocated to the virtual memory executing the guest operating system. A guest operating system that releases storage may not change the amount of storage allocated to the virtual machine and may just change the use of the storage allocated to the virtual machine. Therefore, a guest operating system that releases storage may enable the total amount of storage allocated to the virtual machine to remain constant (e.g., approximately the same). Relinquishing storage may involve the guest operating system identifying a portion of storage that can be given back to the hypervisor so that the total amount of storage allocated to the virtual machine changes (e.g., does not remain constant) and either decreases (e.g., balloon inflates) or increases (balloon deflates). Releasing or relinquishing a memory page may involve instructing a virtual machine to execute an operation that is the same or similar to freeing, deallocating, dereferencing, deleting, removing, other operation, or a combination thereof, and may result in the memory page being available for allocating to current or another virtual machine and reuse by current or another guest operating system. In one example, the operation may be initiated by the hypervisor 120 in response to the decision from analysis module 224 regarding the releasable memory page.

Content clearing module 226 may use the data from analysis module 224 to access a set of selected storage units and selectively clear one or more of the selected blocks. Clearing the content may involve overwriting, replacing, resetting, wiping, or zeroing out the data within the storage unit and may additionally involve swapping out the data to a backing disk. In one example, content clearing module 226 may swap out the content of the releasable memory page identified by hypervisor 120 and clean the memory page for releasing or relinquishing. In another example, content clearing module 226 may allow a choice of swapping out the content of the releasable memory page identified by hypervisor 120 to a backing store or deleting the content without a backup, and then, after the content is either swapped out or given up, clean the memory page for releasing or relinquishing. For example, the choice may be performed by the respective virtual machine or the hypervisor, and may be decided based on a privilege level or an importance level of the content. The clearing may occur before, during, or after the storage unit is allocated to the requesting virtual machine but before the requesting virtual machine can access the content of the storage unit.

Figure 3:
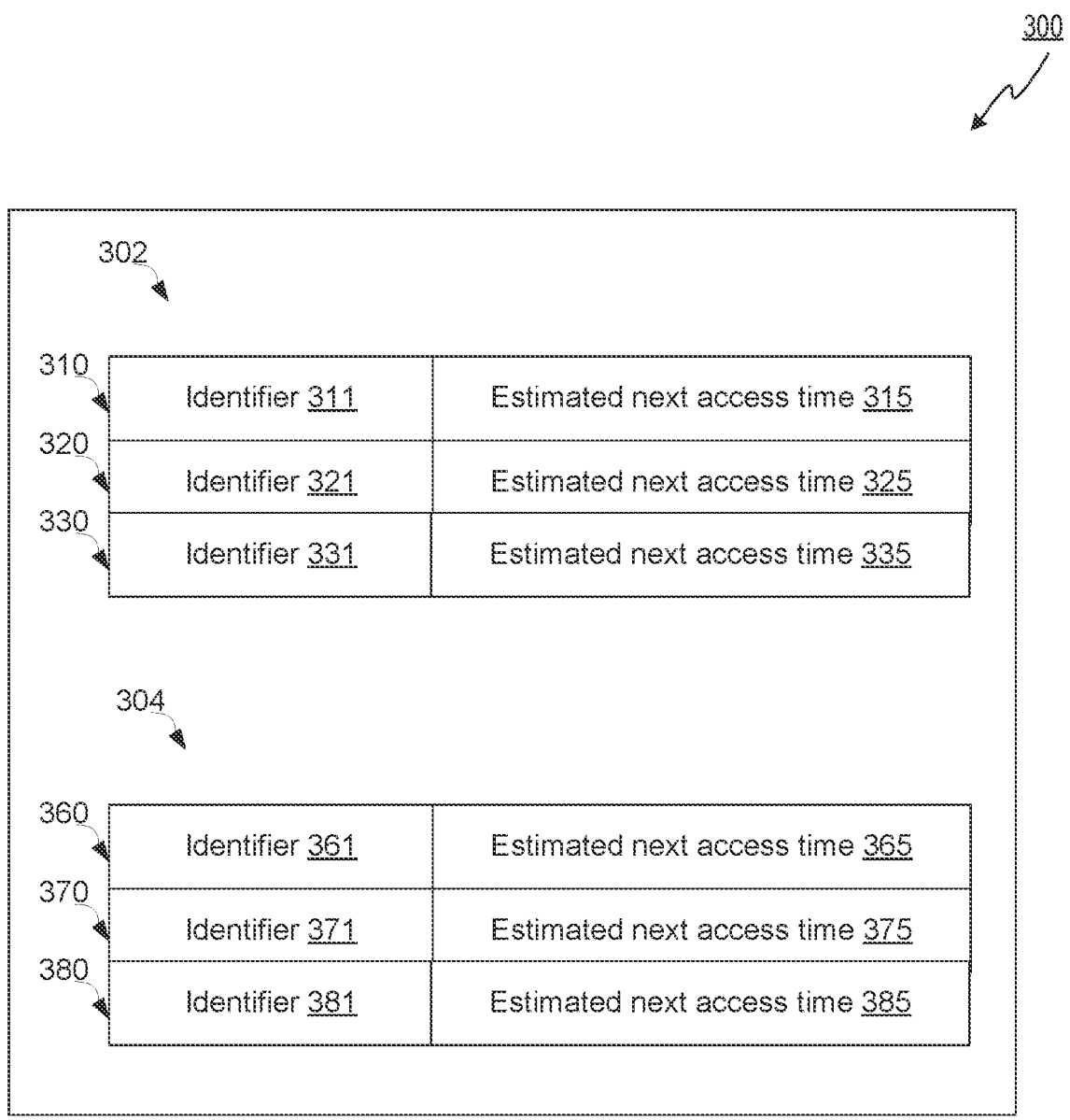
FIG. 3 depicts a schematic diagram of an example of a data structure, in accordance with one or more aspects of the present disclosure.

FIG. 3 schematically illustrates an example 300 of a data structure in accordance with some implementations of the present disclosure. The data structure 300 may include any suitable data structure that can be used to store access data regarding each memory unit (e.g., a memory page or a memory block). As illustrated, the data structure 300 may include one or more lists (e.g., list 302, 304). Each list may be sorted with one or more sorting metrics (e.g., by a lapsed time since last access, by a frequency of access). Each list may include one or more data entries (e.g., data entries 310, 320, 330, 360, 370, 380). Each of the data entries may correspond to a memory page of a virtual memory or a physical memory that can be identified by an identifier (e.g., identifier 311, 321, 331, 361, 371, 381). The identifier may be, for example, a guest address (e.g., a guest virtual address or a guest physical address) associated with the memory page.

As illustrated, each of the data entries may also include a parameter (e.g., estimated next access time 315, 325, 335, 365, 375, 385) that indicates an expected time until next access to a memory page corresponding to the data entry. For example, a first value of the estimated next access time may be "0" or any other value lower than a threshold value, and a second value of the estimated next access time may be "1" or any other value that is larger than a threshold value. The memory page associated with the second value may be later regarded as being free-able while the memory page associated with the first value may be not regarded as being free-able.

Figure 4:
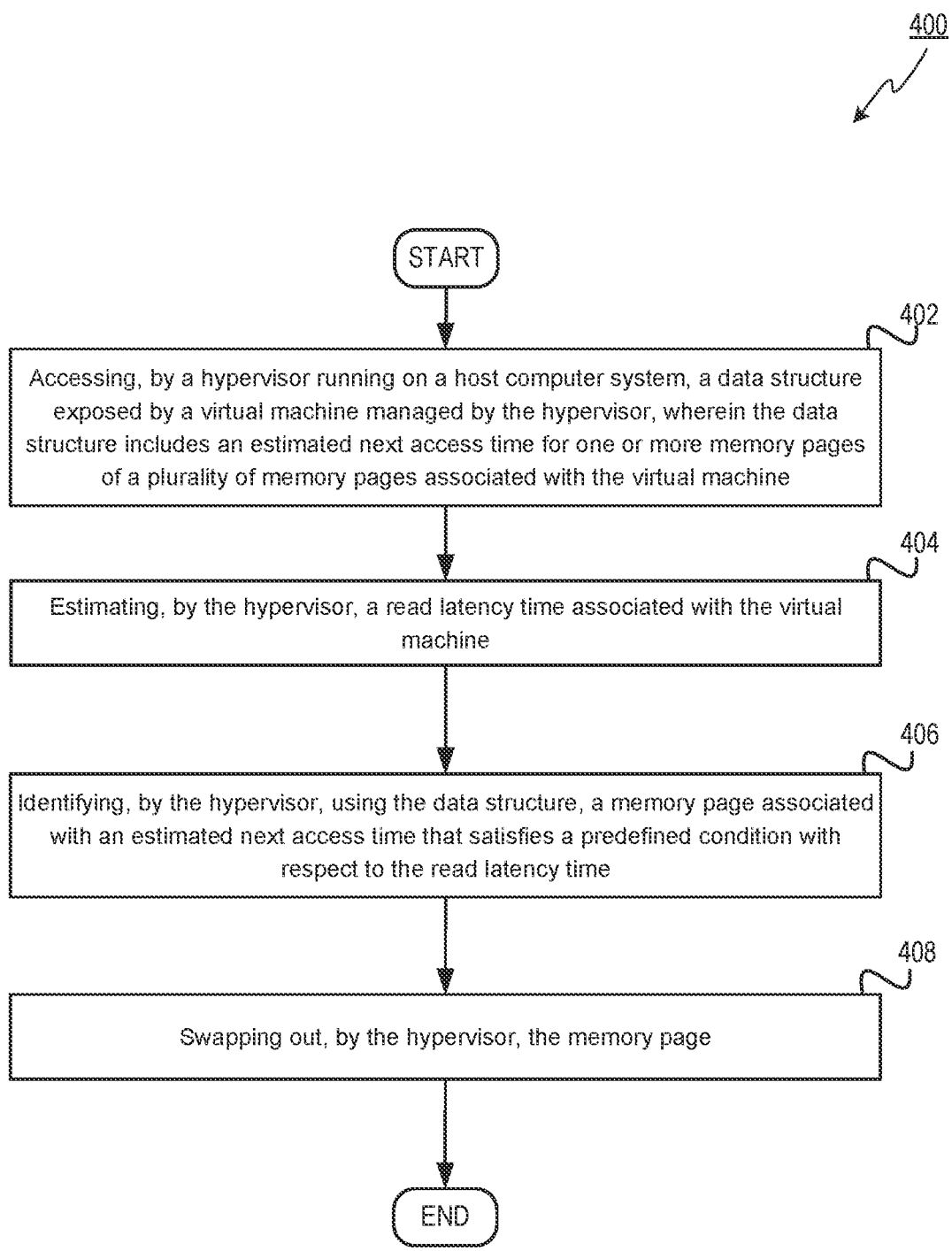
FIG. 4 depicts a flow diagram of an example method for enabling a hypervisor to enhance memory management for virtual machines, in accordance with one or more aspects of the present disclosure.
Figure 5:
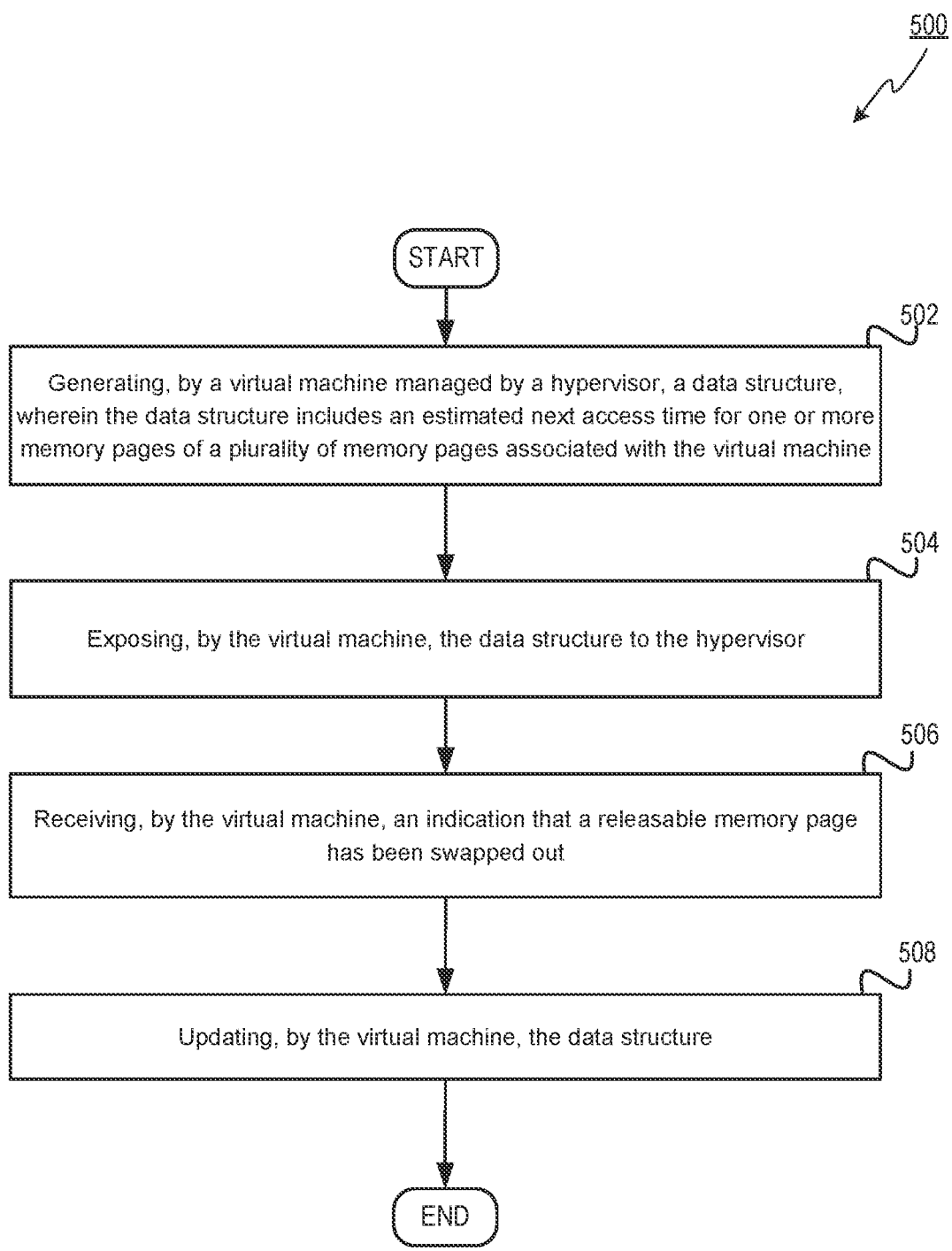
FIG. 5 depicts a flow diagram of another example method for enabling a virtual machine to enhance memory management for virtual machines, in accordance with one or more aspects of the present disclosure.

FIGS. 4 and 5 depict flow diagrams for illustrative examples of methods 300 and 400 for enhanced memory management for virtual machines, in accordance with one or more aspects of the present disclosure. Method 400 illustrates an example process flow from the perspective of the hypervisor and method 500 is an example process flow from the perspective of a virtual machine. Methods 400 and 500 may be performed by processing devices that may comprise hardware (e.g., circuitry, dedicated logic, programmable logic, microcode, etc.), executable code (such as is run on a general purpose computer system or a dedicated machine), or a combination of both. Methods 400 and 500 and each of their individual functions, routines, subroutines, or operations may be performed by one or more processors of the computer device executing the method. In certain implementations, methods 400 and 500 may each be performed by a single processing thread. Alternatively, methods 400 and 500 may be performed by two or more processing threads, each thread executing one or more individual functions, routines, subroutines, or operations of the method. In an illustrative example, the processing threads implementing methods 400 and 500 may be synchronized (e.g., using semaphores, critical sections, and/or other thread synchronization mechanisms). Alternatively, the processes implementing methods 400 and 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 400 and 500 may be performed by computer system 100 as shown in FIG. 1.

Referring now to FIG. 4, method 400 may be performed by processing devices of a server device or a client device. In one implementation, method 400 may be performed by hypervisor 120 of FIGS. 1 and 2 and may begin at block 402.

At block 402, a hypervisor running on a host computer system may access a data structure exposed by a virtual machine managed by the hypervisor, wherein the data structure includes an estimated next access time for one or more memory pages of a plurality of memory pages associated with the virtual machine. In one example, the data structure may be stored in storage space of the virtual machine that is accessible by the hypervisor. In another example, the data structure may be stored in storage space of the hypervisor that is accessible by the virtual machine.

The data structure may be an array (e.g., bitmap), a linked list, other data structure, or a combination thereof. The next access time for one or more memory pages may be estimated by the virtual machine by analyzing a lapsed time from last access to a memory page and/or a frequency of access to a memory page. The next access time may be estimated and/or provided by the guest operating system in various ways. In one example, the data structure may include lists of multiple memory pages and each list is sorted by the likelihood that a memory page will get accessed in a near future. In another example, the data structure may include multi-generational least-recently-used data structure as described above. In yet another example, the data structure may include multi-tier least-recently-used data structure. The multi-tier least-recently-used data structure may include multiple tiers sorted by the frequency of access.

At block 404, the hypervisor may estimate a read latency time associated with the virtual machine, i.e., an expected time for the virtual machine to read a memory page from a backing store. In one example, the read latency time may additionally include a VM exit time, which represents the transition time for the virtual machine temporarily yielding execution control to the hypervisor. The read latency time may be predetermined during manufacturing the storage device and/or may be updated according to various optimization methods.

At block 406, the hypervisor may identify, using the data structure, a memory page associated with an estimated next access time that satisfies a predefined condition with respect to the read latency time. The predefined condition may allow the releasable memory page to be an in-use but free-able memory page from the virtual machine. In one example, hypervisor 120 may identify the releasable memory page by determining whether the next-access time is larger than or equal to the read-latency time multiplied (or added) by a factor value for each said memory page and identifying the memory page as releasable if it is determined that the next-access time is larger than or equal to the read-latency time multiplied (or added) by a factor value. The factor value may be set to be dependent on a memory stress, and the more the memory stress the lower the factor value. For example, the factor value may be at least 10.

At block 408, the hypervisor may swap out the memory page that is identified by the hypervisor as releasable. The hypervisor may swap out the memory page to fulfill requests from computing entities for additional storage units. In one example, the hypervisor may swap out the content of the releasable memory page and clean the memory page for releasing or relinquishing. In another example, the hypervisor may allow a choice of swapping out the content of the releasable memory page to a backing store or deleting the content without a backup, and then, after the content is either swapped out or given up, clean the memory page for releasing or relinquishing. For example, the choice may be performed by the respective virtual machine or the hypervisor, and may be decided based on a privilege level or an importance level of the content. Responsive to completing the operations described herein above with references to block 308, the method may terminate.

Referring now to FIG. 5, method 500 may be performed by processing devices of a server device or a client device. In one implementation, method 500 may be performed by one or more of virtual machines 110A-C of FIG. 1 and may begin at block 502.

At block 502, a virtual machine managed by a hypervisor may generate a data structure, wherein the data structure includes an estimated next access time for one or more memory pages of a plurality of memory pages associated with the virtual machine. The data structure may be an array (e.g., bitmap), a linked list, other data structure, or a combination thereof. The next access time for one or more memory pages may be estimated by the virtual machine by analyzing a lapsed time from last access to a memory page and/or a frequency of access to a memory page. The estimate next access time may be estimated and/or provided by the guest operating system in various ways. In one example, the data structure may include lists of multiple memory pages and each list is sorted by the likelihood that a memory page will get accessed in a near future. In another example, the data structure may include multi-generational least-recently-used data structure as described above. In yet another example, the data structure may include multi-tier least-recently-used data structure. The multi-tier least-recently-used data structure may include multiple tiers sorted by the frequency of access.

At block 504, the virtual machine may expose the data structure to the hypervisor. In one example, the data structure may be stored in storage space of the virtual machine that is accessible by the hypervisor. In another example, the data structure may be stored in storage space of the hypervisor that is accessible by the virtual machine. The virtual machine may expose the data structure to the hypervisor by using an indication to the hypervisor 120 regarding date from the data structures 113A-C. The indication may be a message transmitted from virtual machines to hypervisor that includes identification data (e.g., identifier) and other metadata (e.g., next access time) of a memory page or a range of memory pages. The indication may be one of a series of indications and each indication in the series may identify an individual memory page or an individual range of memory pages.

At block 506, the virtual machine may receive an indication that a releasable memory page has been swapped out. The indication may include one or more signals for indicating to guest operating systems that one or more memory pages of the guest operating systems that has been identified as releasable have been swapped out. The indication may include one or more signals that identify the status of memory pages to indicate to virtual machines which memory pages include guest pages that are active, releasable, released, unallocated, or other state. The indication may include an element (e.g., bit, node) for each of the memory pages and the element may indicate whether the memory page is active, releasable, released, unallocated, or other state.

At block 508, the virtual machine may update the data structure in respond to receiving the indication that the releasable memory page has been swapped out. The updating may include updating identification data (e.g., identifier) and other metadata (e.g., next access time) of a memory page or a range of memory pages. Responsive to completing the operations described herein above with references to block 508, the method may terminate.

Figure 6:
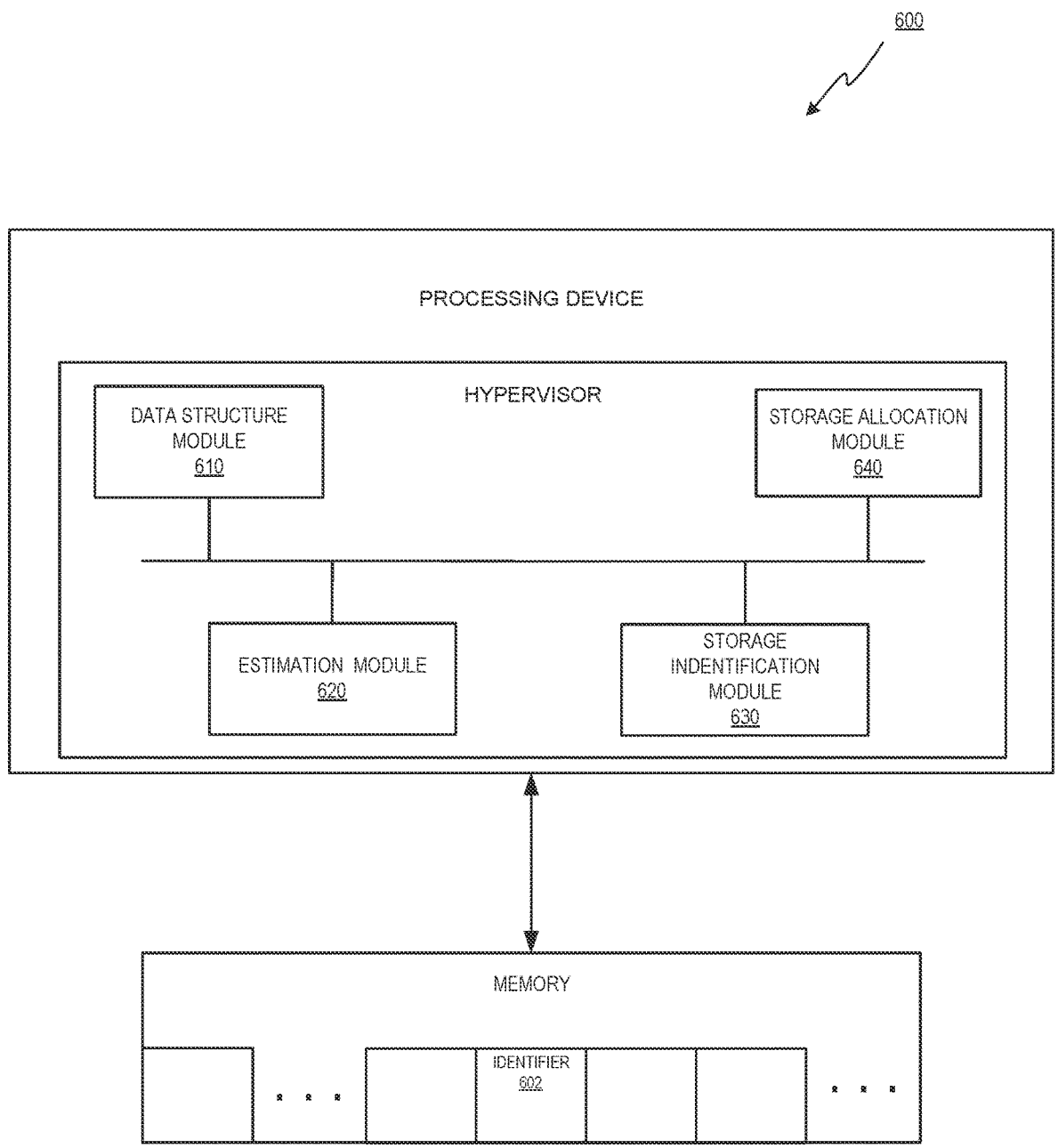
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to computing system 100 of FIG. 1 and may include one or more processing devices and one or more memory devices. In the example shown, computer system 600 may include a data structure module 610, an estimation module 620, a storage identification module 630, and a storage allocation module 640.

Data structure module 610 may enable a processing device executing a hypervisor to accessing a data structure for a particular data regarding memory management. In one example, the particular data regarding memory management may involve an estimated next access time for one or more memory pages of a plurality of memory pages associated with a virtual machine managed by the hypervisor. The next access time for one or more memory pages may be estimated by the virtual machine by analyzing a lapsed time from last access to a memory page and/or a frequency of access to a memory page. The next access time may be estimated and/or provided by the guest operating system in various ways. In one example, the data structure may include lists of multiple memory pages and each list is sorted by the likelihood that a memory page will get accessed in a near future. In another example, the data structure may include multi-generational least-recently-used data structure as described above. In yet another example, the data structure may include multi-tier least-recently-used data structure. The multi-tier least-recently-used data structure may include multiple tiers sorted by the frequency of access.

Estimation module 620 may enable the processing device executing the hypervisor to estimate a value associated with a specific virtual machine for memory management. In one example, the value associated with a specific virtual machine for memory management may involve a read latency time associated with the virtual machine, i.e., an expected time for the virtual machine to read a memory page from a backing store. In one example, the read latency time may additionally include a VM exit time, which represents the transition time for the virtual machine temporarily yielding execution control to the hypervisor. The read latency time may be predetermined during manufacturing the storage device and/or may be updated according to various optimization methods.

Storage identification module 630 may enable the processing device executing the hypervisor to identify one or more storage units for memory management by identifier 602 based on the data obtained from the data structure module 610 and the estimation module 620. In one example, the hypervisor may identify, using the data structure, a memory page associated with an estimated next access time that satisfies a predefined condition with respect to the read latency time. The predefined condition may allow the releasable memory page to be an in-use but free-able memory page from the virtual machine. In one example, hypervisor may identify the releasable memory page by determining whether the next-access time is larger than or equal to the read-latency time multiplied (or added) by a factor value for each said memory page and identifying the memory page as releasable if it is determined that the next-access time is larger than or equal to the read-latency time multiplied (or added) by a factor value. The factor value may be set to be dependent on a memory stress, and the more the memory stress the lower the factor value. For example, the factor value may be at least 10.

Such identifying may be performed when a plurality of virtual machines are managed by the hypervisor for memory management. The hypervisor may use various manners to identify the releasable memory page for optimum memory management. In one example, storage identification module 630 may identify, for each virtual machine, a releasable memory page among memory pages as described above, and then compare the releasable memory pages from all virtual machines to identify one of them as the releasable memory page or identify them by ranking from most ideal to least ideal as releasable. In another example, storage identification module 630 may analyze and compare the data structures of all virtual machines and identify one virtual machine as a candidate, and then identify a releasable memory page of the candidate virtual machine as described above.

Storage allocation module 640 may enable the processing device executing the hypervisor to execute an operation to allocate the memory page that is identified by the hypervisor as releasable. Allocating the memory page to the virtual machine that requested it may involve updating one or more data structures that manage the storage to indicate that the memory page has been allocated to the virtual machine. Allocating the memory page may be equivalent to the hypervisor reusing the memory page for any task. In one example, the hypervisor may swap out the memory page to fulfill requests from computing entities for additional storage units. In one example, the hypervisor may swap out the content of the releasable memory page and clean the memory page for releasing or relinquishing. In another example, the hypervisor may allow a choice of swapping out the content of the releasable memory page to a backing store or deleting the content without a backup, and then, after the content is either swapped out or given up, clean the memory page for releasing or relinquishing. For example, the choice may be performed by the respective virtual machine or the hypervisor, and may be decided based on a privilege level or an importance level of the content.

Figure 7:
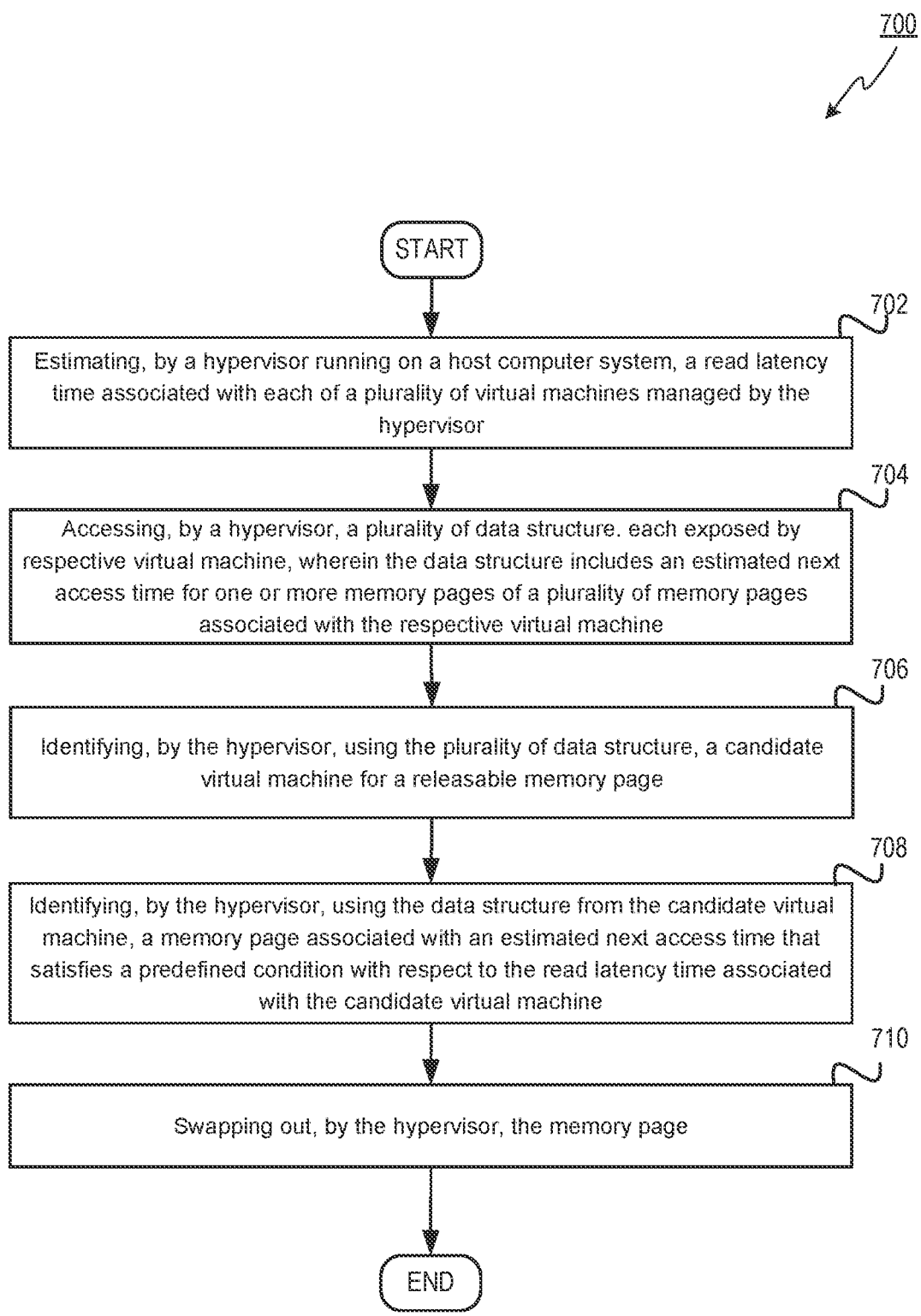
FIG. 7 depicts a flow diagram of another example method for a hypervisor to implement enhanced memory management for virtual machines, in accordance with one or more aspects of the present disclosure.

FIG. 7 depicts a flow diagram of one illustrative example of a method 700 for enhanced memory management, in accordance with one or more aspects of the present disclosure. Method 700 may be similar to method 400 and may be performed in the same or a similar manner as described above in regards to method 400. Method 700 may be performed by processing devices of a server device or a client device and may begin at block 702.

At block 702, a hypervisor running on a host computing device may estimate a read latency time associated with each of a plurality of virtual machines managed by the hypervisor, i.e., an expected time for the virtual machine to read a memory page from a backing store. In one example, the read latency time may additionally include a VM exit time, which represents the transition time for the respective virtual machine temporarily yielding execution control to the hypervisor. The read latency time may be predetermined during manufacturing the storage device and/or may be updated according to various optimization methods.

At block 704, the hypervisor may access a plurality of data structure each exposed by the respective virtual machine, wherein the data structure includes an estimated next access time for one or more memory pages of a plurality of memory pages associated with the respective virtual machine. In one example, the data structure may be stored in storage space of the respective virtual machine that is accessible by the hypervisor. In another example, the data structure may be stored in storage space of the hypervisor that is accessible by the respective virtual machine.

The data structure may be an array (e.g., bitmap), a linked list, other data structure, or a combination thereof. The next access time for one or more memory pages may be estimated by the respective virtual machine by analyzing a lapsed time from last access to a memory page and/or a frequency of access to a memory page. The next access time may be estimated and/or provided by the respective guest operating system in various ways. In one example, the data structure may include lists of multiple memory pages and each list is sorted by the likelihood that a memory page will get accessed in a near future. In another example, the data structure may include multi-generational least-recently-used data structure as described above. In yet another example, the data structure may include multi-tier least-recently-used data structure. The multi-tier least-recently-used data structure may include multiple tiers sorted by the frequency of access.

At block 706, the hypervisor may analyze and compare the data structures of all virtual machines and identify one virtual machine among the plurality of virtual machines as a candidate for a releasable memory page. For example, the hypervisor may compare the largest next access time of each virtual machine among all virtual machines and select the virtual machine that has the highest value of the largest next access time among all virtual machines as the candidate.

At block 708, the hypervisor may identify, using the data structure from the candidate virtual machine, a memory page associated with an estimated next access time that satisfies a predefined condition with respect to the read latency time, which may be same as or similar to block 406 as described above. At block 710, the hypervisor may swap out the memory page that is identified by the hypervisor as releasable, which may be same as or similar to block 408 as described above. Responsive to completing the operations described herein above with references to block 710, the method may terminate.

Figure 8:
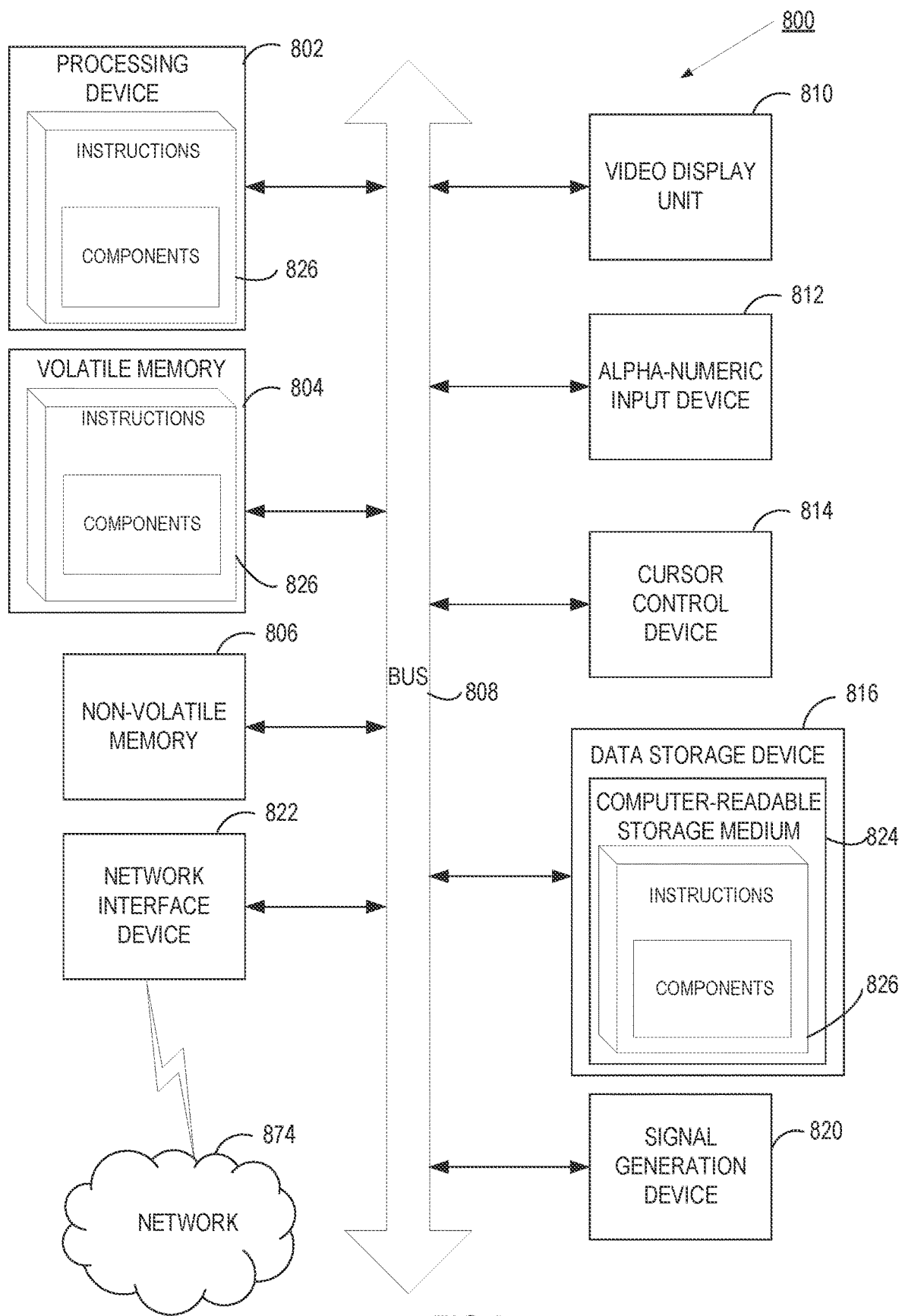
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 400, 500, or 700 and for components of FIGS. 1 and 2.

Instructions 826 may also reside, completely or partially, within volatile memory 804 and/or within processing device 802 during execution thereof by computer system 800, hence, volatile memory 804, and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500, 700 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    accessing, by a processing device executing a hypervisor running on a host computer system, a data structure generated by and exposed by a virtual machine managed by the hypervisor, wherein the data structure includes an estimated next access time for memory pages of a plurality of memory pages associated with the virtual machine, and wherein the estimated next access time for the memory pages of the plurality of memory pages associated with the virtual machine is sorted based on a likelihood of access of the memory pages;
    estimating, by the hypervisor, a read latency time associated with the virtual machine, wherein the read latency time includes an expected read time and a virtual machine exit time;
    identifying, by the processing device executing the hypervisor and using the data structure, a memory page associated with the estimated next access time that satisfies a predefined condition with respect to the read latency time; and
    swapping, by the hypervisor, out the memory page.

2. The method of claim 1, further comprising:
    making the memory page inaccessible by the virtual machine.

3. The method of claim 1, further comprising:
assigning the memory page to a second virtual machine managed by the hypervisor.

4. The method of claim 1, wherein estimating the read latency time further comprises analyzing a lapsed time from a last access to the memory page.

5. The method of claim 1, wherein estimating the read latency time further comprises analyzing a frequency of access to the memory page.

6. The method of claim 1, wherein the predefined condition is satisfied when the estimated next access time is larger than or equal to the read latency time adjusted by a factor value.

7. The method of claim 6, wherein the factor value is set to be dependent on a memory stress metric.

8. The method of claim 1, further comprising:
identifying the plurality of memory pages each associated with the estimated next access time that satisfies the predefined condition with respect to the read latency time; and
determining one of the plurality of memory pages as the memory page.

9. The method of claim 8, further comprising:
comparing the estimated next access time of the plurality of memory pages.

10. The method of claim 1, further comprising:
accessing, by the hypervisor, a second data structure in a guest memory space of a second virtual machine managed by the hypervisor; and
identifying the memory page using the second data structure.

11. A system comprising:
a memory; and
a processing device operatively coupled to the memory to:
access, by a hypervisor running on a host computer system, a data structure generated by and exposed by a virtual machine managed by the hypervisor, wherein the data structure includes an estimated next access time for memory pages of a plurality of memory pages associated with the virtual machine, and wherein the estimated next access time for the memory pages of the plurality of memory pages associated with the virtual machine is sorted based on a likelihood of access of the memory pages;
estimate, by the hypervisor, a read latency time associated with the virtual machine, wherein the read latency time includes an expected read time and a virtual machine exit time;
identify, by the hypervisor and using the data structure, a memory page associated with the estimated next access time that satisfies a predefined condition with respect to the read latency time; and
swap, by the hypervisor, out the memory page.

12. The system of claim 11, wherein the processing device is further to:
make the memory page inaccessible by the virtual machine.

13. The system of claim 11, wherein the processing device is further to:
assign the memory page to a second virtual machine managed by the hypervisor.

14. The system of claim 11, wherein the predefined condition is satisfied when the estimated next access time is larger than or equal to the read latency time adjusted by a factor value.

15. The system of claim 14, wherein the factor value is set to be dependent on a memory stress metric.

16. The system of claim 11, wherein to estimate the read latency time associated with the virtual machine, the processing device is to analyze a lapsed time from a last access to the memory page.

17. The system of claim 11, wherein to estimate the read latency time associated with the virtual machine, the processing device is to analyze a frequency of access to the memory page.

18. A non-transitory machine-readable storage medium storing instructions which, when executed by a processing device, cause the processing device to:
accessing, by the processing device executing a hypervisor running on a host computer system, a data structure generated by and exposed by a virtual machine managed by the hypervisor, wherein the data structure includes an estimated next access time for memory pages of a plurality of memory pages associated with the virtual machine, and wherein the estimated next access time for the memory pages of the plurality of memory pages associated with the virtual machine is sorted based on a likelihood of access of the memory pages;
estimating, by the hypervisor, a read latency time associated with the virtual machine, wherein the read latency time includes an expected read time and a virtual machine exit time;
identifying, by the processing device executing the hypervisor and using the data structure, a memory page associated with the estimated next access time that satisfies a predefined condition with respect to the read latency time; and
swap, by the hypervisor, out the memory page.

19. The non-transitory machine-readable storage medium of claim 18, wherein the instructions, when executed by the processing device, cause the processing device further to:
make the memory page inaccessible by the virtual machine.

20. The non-transitory machine-readable storage medium of claim 18, wherein the instructions, when executed by the processing device, cause the processing device further to:
assign the memory page to a second virtual machine managed by the hypervisor.

* * * * *